(12) United States Patent
Desmeules et al.

(10) Patent No.: US 11,708,078 B2
(45) Date of Patent: Jul. 25, 2023

(54) SLIP CONTROL METHOD AND ARRANGEMENT FOR A DRIVETRAIN ARCHITECTURE INCLUDING A CONTINUOUSLY VARIABLE TRANSMISSION

(71) Applicant: TRANSMISSION CVTCORP INC., Sainte-Julie (CA)

(72) Inventors: Jean-Robert Desmeules, Montréal (CA); Jean-Philippe Parent, Mont St-Hiliaire (CA)

(73) Assignee: TRANSMISSION CVTCORP INC., Ste-Julie (CA)

( * ) Notice: Subject to any disclaimer, the term of this patent is extended or adjusted under 35 U.S.C. 154(b) by 11 days.

(21) Appl. No.: 17/595,481

(22) PCT Filed: May 28, 2020

(86) PCT No.: PCT/CA2020/050730
§ 371 (c)(1),
(2) Date: Nov. 17, 2021

(87) PCT Pub. No.: WO2020/243820
PCT Pub. Date: Dec. 10, 2020

(65) Prior Publication Data
US 2022/0227370 A1    Jul. 21, 2022

Related U.S. Application Data

(60) Provisional application No. 62/856,441, filed on Jun. 3, 2019.

(51) Int. Cl.
*F16H 61/66* (2006.01)
*B60W 30/188* (2012.01)
(Continued)

(52) U.S. Cl.
CPC .......... *B60W 30/188* (2013.01); *B60W 10/02* (2013.01); *B60W 10/101* (2013.01);
(Continued)

(58) Field of Classification Search
CPC .. B60W 10/02; B60W 10/101; B60W 30/188; B60W 2510/02;
(Continued)

(56) References Cited

U.S. PATENT DOCUMENTS 5,062,049 A    10/1991   Taylor
5,094,129 A *   3/1992   Sugaya ............. F16H 61/66259
                                                                 474/11

(Continued)

FOREIGN PATENT DOCUMENTS

WO    2015/1063 50 A1    7/2015

*Primary Examiner* — Edwin A Young
(74) *Attorney, Agent, or Firm* — Fay Kaplun & Marcin, LLP

(57) ABSTRACT

A slip control method and arrangement for a drivetrain including a continuously variable transmission, forward-reverse clutch arrangement and an optional three-speed gearbox is described herein. The forward-reverse clutch arrangement includes a clutch that is so controlled as to slip when a torque higher than the usable torque attempts to pass through. Accordingly, the clutch prevents the prime mover from stalling.

15 Claims, 3 Drawing Sheets

(51) Int. Cl.
*B60W 10/02* (2006.01)
*B60W 10/101* (2012.01)
*F16H 59/14* (2006.01)
*F16H 59/36* (2006.01)

(52) U.S. Cl.
CPC ............ *F16H 59/14* (2013.01); *F16H 59/36* (2013.01); *F16H 61/66* (2013.01); *B60W 2510/02* (2013.01); *B60W 2510/0638* (2013.01); *B60W 2510/0657* (2013.01); *B60W 2710/025* (2013.01); *B60W 2710/1005* (2013.01); *F16H 2059/366* (2013.01); *F16H 2061/6604* (2013.01)

(58) Field of Classification Search
CPC . B60W 2510/0638; B60W 2510/0657; B60W 2710/025; B60W 2710/1005; F16H 59/14; F16H 59/36; F16H 61/66; F16H 2059/366; F16H 261/6604
See application file for complete search history.

(56) References Cited

U.S. PATENT DOCUMENTS

| | | | | |
|---|---|---|---|---|
| 5,890,991 | A | * | 4/1999 | Sakakiyama ..... F16H 61/66259 701/52 |
| 2016/0332629 | A1 | * | 11/2016 | Dionne ............... B60W 10/101 |
| 2017/0198812 | A1 | * | 7/2017 | Girard .................... B60K 23/00 |

* cited by examiner

SLIP CONTROL METHOD AND ARRANGEMENT FOR A DRIVETRAIN ARCHITECTURE INCLUDING A CONTINUOUSLY VARIABLE TRANSMISSION

FIELD

The present disclosure generally relates to drivetrains architectures including a continuously variable transmission (CVT). More specifically, the present disclosure is concerned with the architecture of such a drivetrain allowing slip control.

BACKGROUND

CVTs are very interesting in all kinds of vehicles for their ability to continuously vary the speed ratio between the output of a prime mover and the wheels or other rotating parts of a vehicle.

However, some vehicular applications conventionally require a so-called torque converter between the prime mover and the wheels to a) prevent the prime mover from stalling when the wheels are prevented from rotating while powered and b) increase the torque when the torque converter is slipping. These applications are generally not ideal candidates for continually variable transmissions since the advantages of the CVT are mitigated from the use of a torque converter.

DETAILED DESCRIPTION

Figure 1:
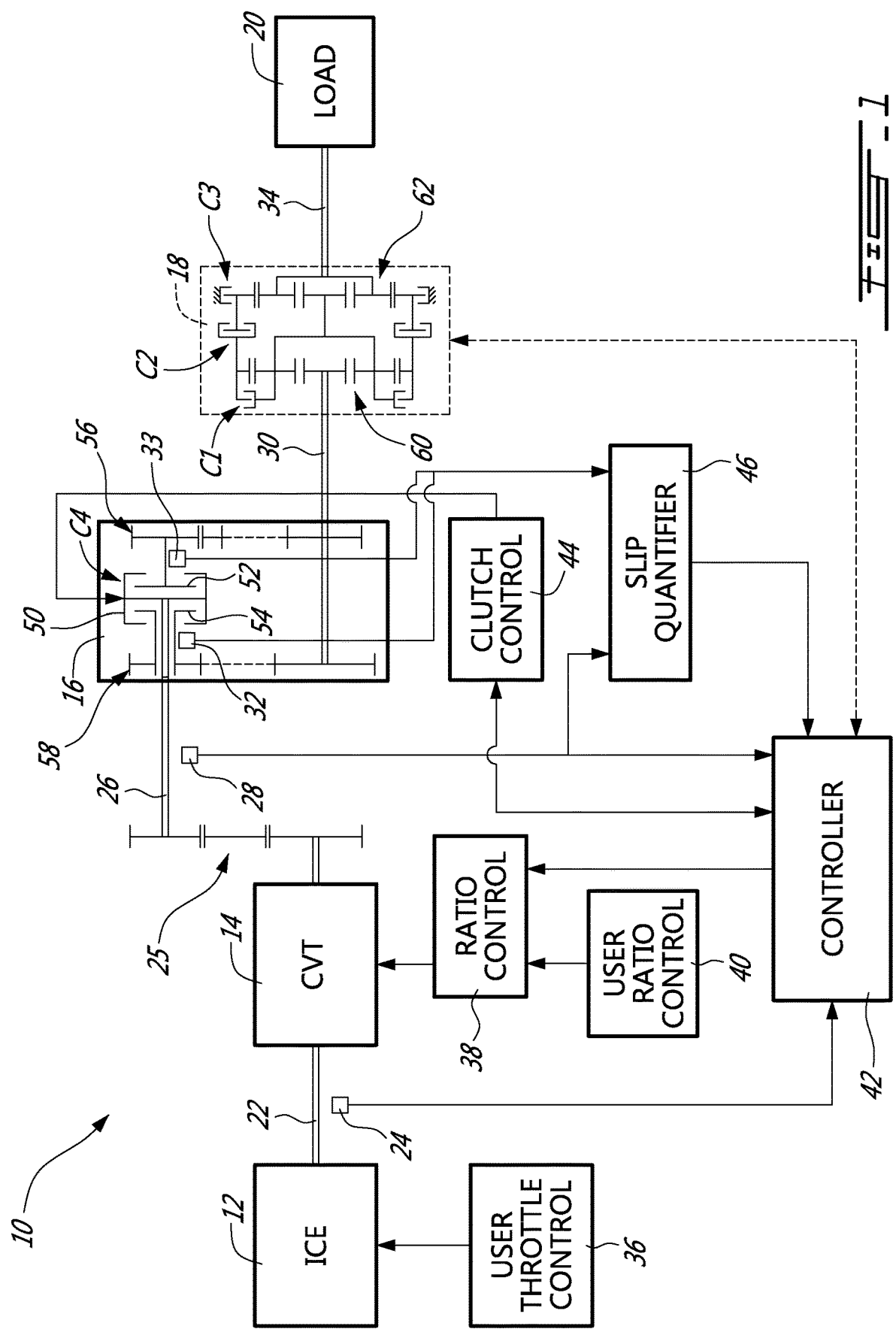
FIG. 1 is a block diagram of a drivetrain architecture including a CVT, a forward-reverse slip control clutch arrangement and an optional multi-speed gearbox according to an illustrative embodiment.

The present disclosure relates to a drivetrain including a CVT. More specifically, the present disclosure relates to a slip control method and an arrangement for a drivetrain architecture including a continuously variable transmission.

According to an illustrative embodiment, there is provided a method to control the slippage of a drivetrain including a prime mover having an output shaft, a transmission having an input connected to the output shaft of the prime mover and an output, a forward-reverse clutch arrangement having an input connected to the output of the transmission and an output, the forward-reverse clutch arrangement including a clutch having a controllable slippage level between its input and output, the slippage control method including: determining the usable torque of the prime mover; and controlling the clutch so as to allow the usable torque to pass therethrough and to cause the clutch to slip should a torque between the input and output of the clutch be greater than the usable torque.

According to another aspect, there is provided a drivetrain including: a prime mover having an output shaft; a prime mover speed sensor measuring the rotational speed of the output shaft; a transmission having an input associated with the output shaft of the prime mover and an output; a forward-reverse clutch arrangement having an input associated with the output of the transmission and an output; the forward-reverse clutch arrangement including a clutch having a controllable slippage level between its input and output; a clutch slip controller controlling the level of torque allowed to pass through the clutch before slippage occurs therein; and a main controller associated with the prime mover speed sensor, and with the clutch slip controller; the main controller being so configured as to determine a usable torque of the prime mover and to set the clutch slip controller so that the clutch slips when a torque higher than the usable torque attempts to pass through the clutch.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The expressions "connected" and "coupled" should be construed herein and in the appended claims broadly so as to include any cooperative or passive association between mechanical parts or components. For example, such parts may be assembled together by direct connection, or indirectly connected using further parts therebetween. The connection can also be remote, using for example a magnetic field or else.

It is to be noted that the expression "prime mover" is to be construed herein and in the appended claims as an internal combustion engine (ICE) a turbine engine, or any other mechanical power production element or assembly.

It is to be noted that the term "CVT", standing for Continuously Variable Transmission, is used herein to describe any type of CVT including, amongst others, a toroidal CVT, a dual-cavity full toroidal CVT, a half-toroidal CVT, a single cavity toroidal CVT, a hydrostatic CVT, a Variable diameter pulley CVT, a magnetic CVT, a ratcheting CVT and a cone CVT.

It will also be noted that the expressions "fixed disk", when used herein and in the appended claims in the context of clutch technology, may be viewed as any element or group of elements constituting a clutch driving member. Similarly, the expressions "movable disk", when used herein and in the appended claims in the context of clutch technology, may be viewed as any element or group of elements constituting a clutch driven member.

It is to be noted that the expression "off-highway vehicle" is to be construed herein and in the appended claims as any type of vehicle that is designed specifically for use off-road, including, amongst others, construction vehicles and agricultural vehicles.

Other objects, advantages and features of the slip control method and arrangement for a drivetrain architecture including a continuously variable transmission will become more apparent upon reading of the following non-restrictive description of illustrative embodiments thereof, given by way of example only with reference to the accompanying drawings.

FIG. 1 of the appended drawings illustrates a drivetrain 10 comprising a prime mover in the form of an ICE 12, a CVT 14, a forward-reverse clutch arrangement 16, and an optional three-speed gearbox 18 including a creeping speed range. The output of the optional gearbox 18 is connected to a load 20, for example the wheels of an off-highway vehicle (not shown). Of course, as will be apparent to one skilled in the art, should the gearbox 18 be absent from the drivetrain 10, the output of the forward-reverse clutch arrangement 16 would be directly connected to the load 20.

A first shaft 22 interconnects the output of the ICE 12 and the input of the CVT 14; the speed of the first shaft 22 is measured via a first speed sensor 24. A gear train 25 is mounted to the output of the CVT 14. A second shaft 26 interconnects the gear train 25 to the input of the forward-reverse clutch arrangement 16; the speed of the second shaft 26 is measured via a second speed sensor 28. A third shaft 30 interconnects the output of the forward-reverse clutch arrangement 16 and the input of the optional gearbox 18. Finally, a fourth shaft 34 interconnects the output of the gearbox 18 and the load 20.

Conventionally, the ICE 12 is associated with a user throttle control 36, for example an acceleration pedal (not shown).

The forward-reverse clutch arrangement 16 includes a three-position clutch C4 having a central fixed disk 50 defining its input and two movable disks 52, 54 respectively defining the reverse and forward outputs of the clutch C4. The clutch arrangement 16 includes third and fourth speed sensors 32 and 33 that monitor the speed of a respective output of the clutch C4.

One skilled in the art will understand that the third and fourth sensors 32 and 33 could be replaced by a single sensor (not shown) that would be positioned at the output of the clutch arrangement 16. In other words, this single sensor would monitor the speed of the third shaft 30.

The forward-reverse clutch arrangement 16 also includes a reverse gear train 56 connected between the reverse output of the clutch C4 and the third shaft 30 and a forward gear train 58 connected between the forward output of the clutch C4 and the third shaft 30.

As will be understood, the clutch C4 is a three-position clutch that is so selected that the slipping between the fixed disk 50 and the movable disks 52 and 54 may be prolonged without adversely affecting the operation or the lifespan of the clutch C4. It is believed to be within the skills of one skilled in the art to select an appropriate three-position clutch C4.

The drivetrain 10 includes a ratio controller 38 so configured as to set the ratio of the CVT 14 according to either a ratio provided by the user via a user ratio control 40 or according to a ratio provided by a main controller 42 as will be described hereinbelow. It will be understood from the foregoing description that the ratio supplied by the main controller 42 has precedence over the user ratio control 40. Accordingly, the main controller 42 may take over and dictate the ratio of the CVT 14.

Alternatively, the user ratio control 40 could be omitted from the drivetrain 10 and the controller 42 would then control the ratio of the CVT according to the various data supplied thereto such as the speed of the output shaft of the ICE 12.

A forward-reverse clutch controller 44 is so configured as to take a usable torque value from the main controller 42 and to control the clutch C4 so as to slip when the torque attempting to pass through is greater than this usable torque. In other words, when the torque between the input and output of the clutch C4 is greater than the usable torque, the clutch C4 slips.

One skilled in the art will have no problem building such a clutch controller adapted to the technology used in the clutch C4.

Of course, the forward-reverse clutch controller 44 also controls the forward and reverse selection from a user direction control (not shown).

The speed data from the first and second speed sensors 24 and 28 is supplied to the main controller 42 so that the controller 42 may determine the actual instantaneous ratio of the CVT in real time. Furthermore, the speed data of the second, third and fourth speed sensors 28, 32 and 33 is supplied to a slip quantifier 46 that may determine if slippage of the clutch C4 occurs, in real time, whether the clutch C4 is in forward or reverse configuration, and supply this data to the main controller 42.

The optional three-speed gearbox 18 includes a first planetary gear train 60 and a second planetary gear train 62. The sun gear of the first planetary gear train 60 defines the input of the three-speed gearbox 18 while the carrier of the second planetary gear train 62 defines the output thereof.

A first clutch C1 selectively interconnects the carrier and the ring gears of the first planetary gear train 60; a second clutch C2 selectively interconnects the ring gears of the planetary gear trains and a third clutch C3 selectively interconnects the ring gear of the second planetary gear train 62 to the casing (not shown) of the gearbox 18. One will also note that the carrier of the first planetary gear train 60 is connected to the sun gear of the second planetary gear train 62.

The three-speed gearbox 18 is in a creeping range configuration when the clutch C2 and C3 are engaged. When in this configuration, both ring gears are connected to the casing of the gearbox and are therefore prevented from rotating. In this configuration, both planetary gear trains are in a speed-reducing mode and are cascading. One skilled in the art will understand that this configuration decreases the power required of the ICE 12 since the very high resulting gear ratio increases the output power.

The three-speed gearbox 18 is in a medium speed range configuration when the clutch C1 and C3 are engaged. When in this configuration, the carrier and the ring of the first planetary gear train 60 are connected and the ring gear of the second planetary gear train 62 is connected to the casing and therefore prevented from rotating.

The three-speed gearbox 18 is in a high speed range configuration when the clutch C1 and C2 are engaged. When in this configuration, the carrier and the ring of the first planetary gear train 60 are connected and both are connected to the ring gear of the second planetary gear train 62.

Of course, the selection of the creeping, medium or high speed ranges is made by the user using an input (not shown). Alternatively, the main controller 42 could determine the gear selection of the optional three-speed gearbox 18.

Figure 2:
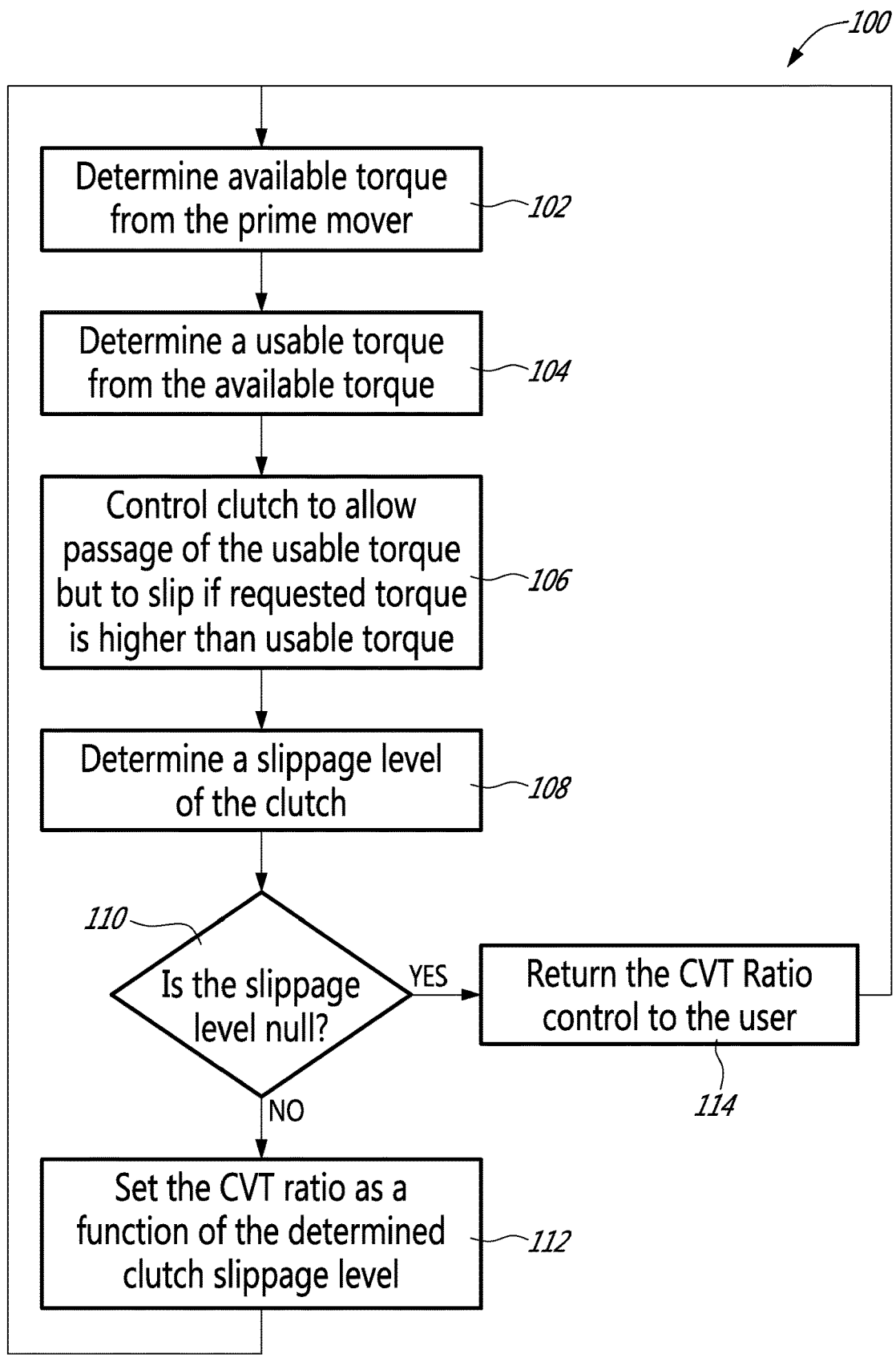
FIG. 2 is a block diagram of a method to control the slip of a forward-reverse clutch.

Turning now to FIG. 2 of the appended drawings, a slip control method 100 for a drivetrain including a continuously variable transmission will be described.

The first step 102 of the method 100 consists of determining the available torque from the prime mover. With reference to FIG. 1, the prime mover, in the form of the ICE 12, has a map of available torque depending on the RPM of its output shaft. This table is either built in the ICE and can be supplied to the controller 42, known and stored in the controller 42 or has been built by the drivetrain manufacturer and stored in the controller 42. Since the controller 42 has the speed data from the first speed sensor 24, it can look up the available torque in real time.

Figure 3:
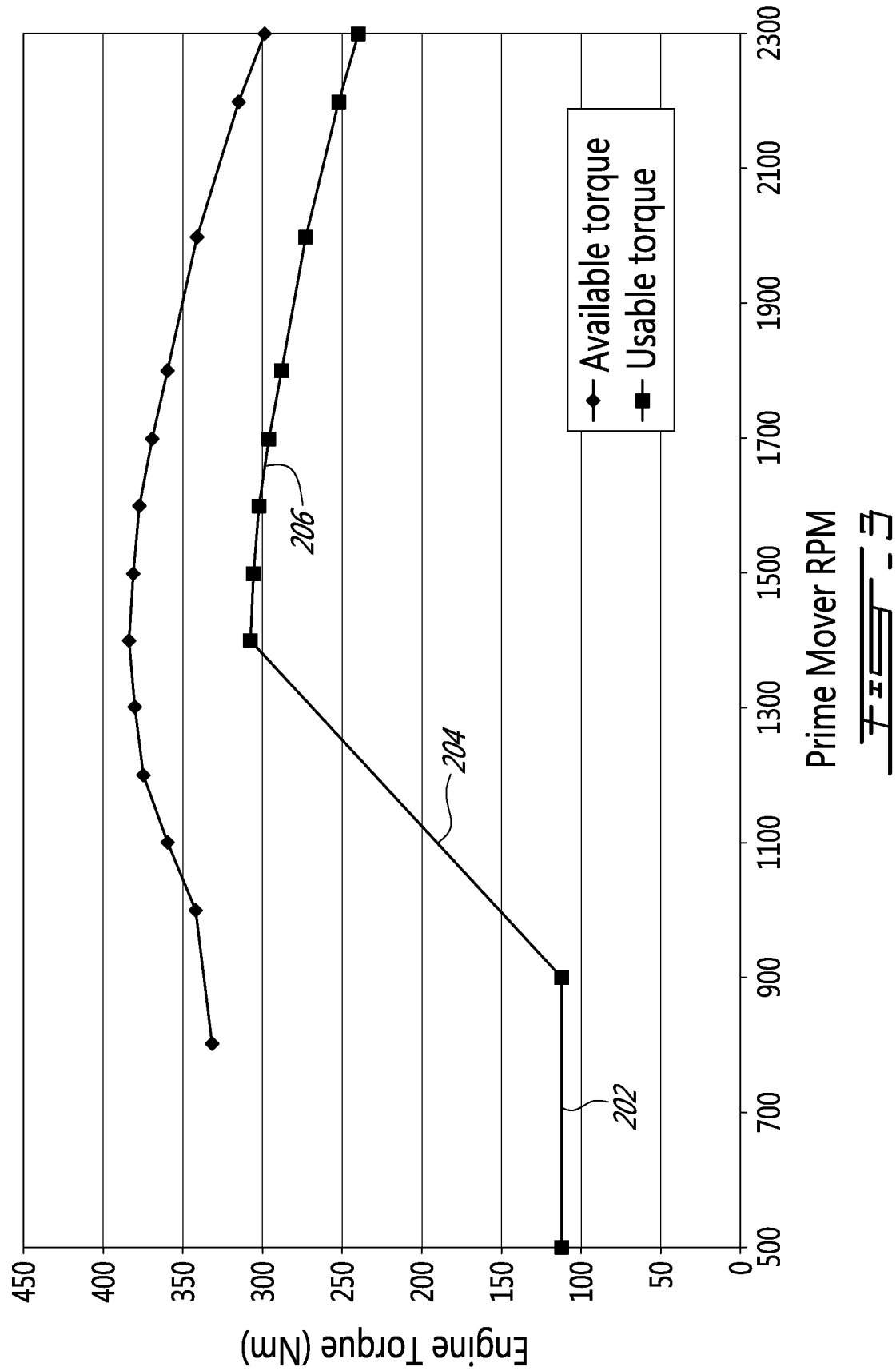
FIG. 3 is a graph illustrating the torque vs. RPM of a prime mover and the torque allowed to pass through a clutch vs. RPM.

FIG. 3 of the appended drawings illustrates the available torque vs. RPM for a particular ICE.

From the instantaneous available torque, the controller 42 determines a usable torque in step 104. The usable torque is lower than the available torque and provides a safety margin to prevent the ICE 12 from stalling. Indeed, the increase in clutch temperature is mainly caused by a partial slipping of the clutch, for example when a torque larger than the usable torque attempts to pass though the clutch C4. Accordingly, should the temperature of the clutch reach a predetermined threshold, the controller 42 may decide to either increase the pressure in the clutch to prevent slipping, decrease the pressure in the clutch to reduce friction and therefore reduce the temperature increase or completely disengage the clutch.

Again, FIG. 3 illustrates the usable torque vs. RPM for a particular ICE. It is to be noted that the usable torque does not follow the available torque at low RPMs. The reason therefor will be explained hereinbelow.

It is to be noted that the usable torque illustrated in FIG. 3 is the usable torque at the output of the ICE 12. The use of a CVT 14 downstream of the ICE allows this usable torque to be modified by the CVT 14. Indeed, the torque is multiplied as a function of the ratio of the CVT. The controller therefore uses its knowledge of the instantaneous ratio of the CVT 14 to determine a usable torque at the input of the forward-reverse clutch arrangement 16 and this value is used in the next steps. In other words, the usable torque graph of FIG. 3 is modulated as a function of the CVT ratio by the controller 42.

It is to be noted that the usable torque values can be stored in a look-up table provided in the main controller 42, for example. Accordingly, the controller 42 may quickly determine the usable torque from the speed of the output of the ICE 12.

The controller 42, in step 106, supplies the instantaneous usable torque to the clutch controller 44 that controls the forward-reverse clutch arrangement 16 so that slippage of the clutch C4 occurs if a torque greater than the usable torque attempts to pass therethrough. Accordingly, should a block load be applied, for example by preventing wheels of the off-highway vehicle from turning, the torque requested by the wheels and therefore attempting to pass through the clutch C4 increases drastically and quickly exceeds the usable torque. When this occurs, the clutch C4 slips, preventing the ICE from stalling and protecting the various components of the drivetrain, including the CVT 14. Indeed, as is well known to those skilled in the art, should the output shaft of the ICE be prevented from rotating while the ICE is operating, the ICE would stall. Slippage of the clutch C4 above a torque level therefore ensures that the output shaft of the ICE is not prevented from rotating.

The method 100 could stop there. It would therefore loop back to step 102 and repeat the above-described steps.

However, since the drivetrain 10 includes a CVT that can inherently modify the speed ratio and therefore the available torque at the input of the clutch C4, supplemental steps may be added to the method 100 to improve the usability of the drivetrain 10.

Step 108 involves the determination of the slippage level of the clutch C4. This is done by the slip quantifier 46 and the slippage data is supplied to the main controller 42.

The controller 42, in step 110, branches to step 112 if the clutch slippage is non-null. In other words, if there is slippage, step 112 is performed.

In step 112, the controller 42 takes over the ratio control 38 and dictates the ratio of the CVT 14. The controller 42 is so configured that the ratio of the CVT is decreased in proportion of the slippage of the clutch C4. Indeed, since the usable torque increases as the CVT ratio decreases, the slippage setpoint of the clutch C4 is automatically modified by the controller 42 and slippage may stabilize, decrease and/or stop.

One possible way of controlling the drivetrain 10 is to control the clutch slippage so as to stabilize it. This is done by gradually changing the CVT ratio until the clutch slippage remains substantially constant.

Step 112 loops back to step 102.

Should no slippage be detected in step 110, the step 114 is performed. In this step, the control of the CVT ratio is gradually returned back to the user since the usable torque is sufficient to drive the load 20. This is done gradually so as to prevent sudden change in driving behavior, which is detrimental to the user driving sensations.

The performance of the drivetrain may be controlled by the user in those circumstances. This step returns to step 102 to loop the method 100.

Returning to FIG. 3, the usable torque graph may be separated in three zones. A low RPM zone 202, a medium RPM zone 204 and a high RPM zone 206.

In the low RPM zone 202, the usable torque is set significantly lower than the available torque. Accordingly, the slippage of the clutch C4 will be more pronounced at these speeds. In this zone, the usable torque is set low enough as to either prevent rotation of the output or allow "creeping" of the output given a small load depending on the desired driving sensation.

In the medium RPM zone 204, the usable torque linearly increases with the RPM but is still significantly lower than the available torque from the prime mover. The clutch slippage set-point will therefore increase with increasing RPM. Accordingly, should a small block load prevent rotation of the wheels, an increase in RPM (while in the zone 204) may cause the wheels to rotate. This has been found to give better driving sensations to the operator. Of course, the linearity of the medium RPM zone is not required, and other functions could be used.

Finally, in the high RPM zone 206, the usable torque follows the available torque with a safety margin.

As an example of application of the drivetrain 10, the operation of a wheel-loader tractor will be briefly described. Such a tractor often has to push against obstacles, for example when its bucket is being filled. When this is the case, the ICE must be prevented from stalling. By providing a drivetrain as proposed herein, the ICE stalling would be prevented by the selective slipping of the clutch C4 and the torque supplied to the wheels would be increased both by the control of the CVT ratio and by placing the three-speed gearbox 18 is its creeping configuration. All that without special intervention of the operator other than actuating the throttle and speed-range controls according to the desired speed of the vehicle.

Of course, a clutch pedal or other user control could be used to disengage the clutch C4 manually by the operator.

As will be easily understood by one skilled in the art, the main controller 42 could integrate the ratio controller 38, the clutch controller 44 and/or the slip quantifier 46.

It is to be understood that the slip control method and arrangement for a drivetrain architecture including a continuously variable transmission is not limited in its application to the details of construction and parts illustrated in the accompanying drawings and described hereinabove. The slip control method and arrangement for a drivetrain architecture including a continuously variable transmission is capable of other embodiments and of being practiced in various ways. It is also to be understood that the phraseology or terminology used herein is for the purpose of description and not limitation. Hence, although the slip control method and arrangement for a drivetrain architecture including a continuously variable transmission has been described hereinabove by way of illustrative embodiments thereof, it can be modified, without departing from the spirit, scope and nature thereof.

What is claimed is:

1. A method for controlling a slippage of a drivetrain including a prime mover having an output shaft, a transmission having an input connected to the output shaft of the prime mover and an output, a forward-reverse clutch arrangement having an input connected to the output of the transmission and an output, the forward-reverse clutch arrangement including a clutch having a controllable slippage level between its input and output, the method comprising:
   determining a usable torque of the prime mover; and
   controlling the clutch so as to allow the usable torque to pass therethrough and to cause the clutch to slip should a torque between the input and output of the clutch be greater than the usable torque.

2. The method of claim 1, wherein the transmission is a continuously variable transmission.

3. The method of claim 1, wherein the drivetrain further includes a three-speed gearbox having an input connected to the output of the forward-reverse clutch arrangement and an output connected to a load.

4. The method of claim 1, wherein the usable torque determining includes determining an available torque of the prime mover according to a speed of the output shaft of the prime mover and calculating the usable torque at the speed of the prime mover.

5. The method of claim 1, further comprising:
   integrating the drivetrain to an off-highway vehicle.

6. A drivetrain, comprising:
   a prime mover having an output shaft;
   a prime mover speed sensor measuring a rotational speed of the output shaft;
   a transmission having an input associated with the output shaft of the prime mover and an output;
   a forward-reverse clutch arrangement having an input associated with the output of the transmission and an output; the forward-reverse clutch arrangement including a clutch having a controllable slippage level between its input and output;
   a clutch slip controller controlling a level of torque allowed to pass through the clutch before slippage occurs therein; and
   a main controller associated with the prime mover speed sensor, and with the clutch slip controller; the main controller being so configured as to determine a usable torque of the prime mover and to set the clutch slip controller so that the clutch slips when a torque higher than the usable torque attempts to pass through the clutch.

7. The drivetrain of claim 6, wherein the transmission is a continuously variable transmission.

8. The drivetrain of claim 7, further comprising:
   an arrangement detecting slippage in the clutch and a ratio controller setting an output/input ratio of the continuously variable transmission,
   wherein the ratio controller decreases the ratio of the continuously variable transmission when slippage is detected.

9. The drivetrain of claim 6, wherein the clutch is a three-position clutch including an input and two outputs respectively connected to a forward and a reverse gear train.

10. The drivetrain of claim 9, further comprising:
    respective speed sensors that monitor a speed of a respective output of the three-position clutch.

11. The drivetrain of claim 6, further comprising:
    a three-speed gearbox having an input connected to the output of the forward-reverse clutch arrangement and an output connected to a load.

12. The drivetrain of claim 11, wherein the three-speed gearbox includes first and second interconnected planetary gear trains.

13. The drivetrain of claim 12, wherein a sun gear of the first planetary gear train defines the input of the three-speed gearbox and wherein a carrier of the second planetary gear train defines the output of the three-speed gearbox.

14. The drivetrain of claim 13, wherein the three-speed gearbox further includes a first clutch selectively interconnecting a carrier and ring gear of the first planetary gear train; a second clutch selectively interconnecting the ring gear of the first and second planetary gear trains; and a third clutch selectively interconnecting the ring gear of the second planetary gear train to a casing of the three-speed gearbox; the carrier of the first planetary gear train being connected to a sun gear of the second planetary gear train.

15. The drivetrain of claim 6, where the drivetrain is integrated in an off-highway vehicle.

* * * * *